(12) United States Patent
Yokokawa et al.

(10) Patent No.: US 8,503,583 B2
(45) Date of Patent: Aug. 6, 2013

(54) RECEIVER, RECEIVING METHOD, PROGRAM AND RECEIVING SYSTEM

(75) Inventors: Takashi Yokokawa, Kanagawa (JP); Osamu Shinya, Kanagawa (JP); Hitoshi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 12/953,832

(22) Filed: Nov. 24, 2010

(65) Prior Publication Data

US 2011/0158354 A1 Jun. 30, 2011

(30) Foreign Application Priority Data

Dec. 25, 2009 (JP) ................................. 2009-294545

(51) Int. Cl.
*H04L 27/06* (2006.01)
(52) U.S. Cl.
USPC ........... 375/340; 375/316; 375/259; 375/260; 375/320; 348/726
(58) Field of Classification Search
USPC ........... 375/340, 316, 259, 260, 320; 348/726
See application file for complete search history.

(56) References Cited

U.S. PATENT DOCUMENTS

| | | | | |
|---|---|---|---|---|
| 2009/0190677 A1* | 7/2009 | Jokela et al. | ................... | 375/260 |
| 2010/0002696 A1* | 1/2010 | Vare et al. | ...................... | 370/390 |
| 2010/0262708 A1* | 10/2010 | Bouazizi et al. | ............... | 709/231 |
| 2010/0283912 A1* | 11/2010 | Sun et al. | ....................... | 348/726 |
| 2011/0013718 A1* | 1/2011 | Ko et al. | ......................... | 375/295 |
| 2011/0235721 A1* | 9/2011 | Chen et al. | ............... | 375/240.25 |
| 2011/0274211 A1* | 11/2011 | Ko et al. | ......................... | 375/300 |

OTHER PUBLICATIONS

"Digital Broadcasting (DVB); Frame structure channel coding and modulation for a second generation digital terrestrial television broadcasting system (DVB-T2)", Jun. 2010, 179 pages.

* cited by examiner

*Primary Examiner* — Kenneth Lam
(74) *Attorney, Agent, or Firm* — Oblon, Spivak, McClelland, Maier & Neustadt, L.L.P.

(57) ABSTRACT

A receiver that receives an Orthogonal Frequency Division Multiplexing (OFDM) signal obtained by modulating a common packet sequence and data packet sequence. The common packet sequence is made up of packets common to a plurality of streams. The data packet sequence is made up of packets specific to one of the plurality of streams. The receiver sorts the common packet sequence, obtained by demodulating the received OFDM signal, in the time domain, and sorts the data packet sequence, obtained by demodulating the received OFDM signal, in the time domain. The receiver then switches the output for error correction from the one sorting over to the other sorting if, while the one sorting supplies its output to the error correction, the other sorting completes its input of a predetermined unit of information to be processed.

15 Claims, 14 Drawing Sheets

NTI=1

NTI=3

FIG.4
WHEN NTI=1
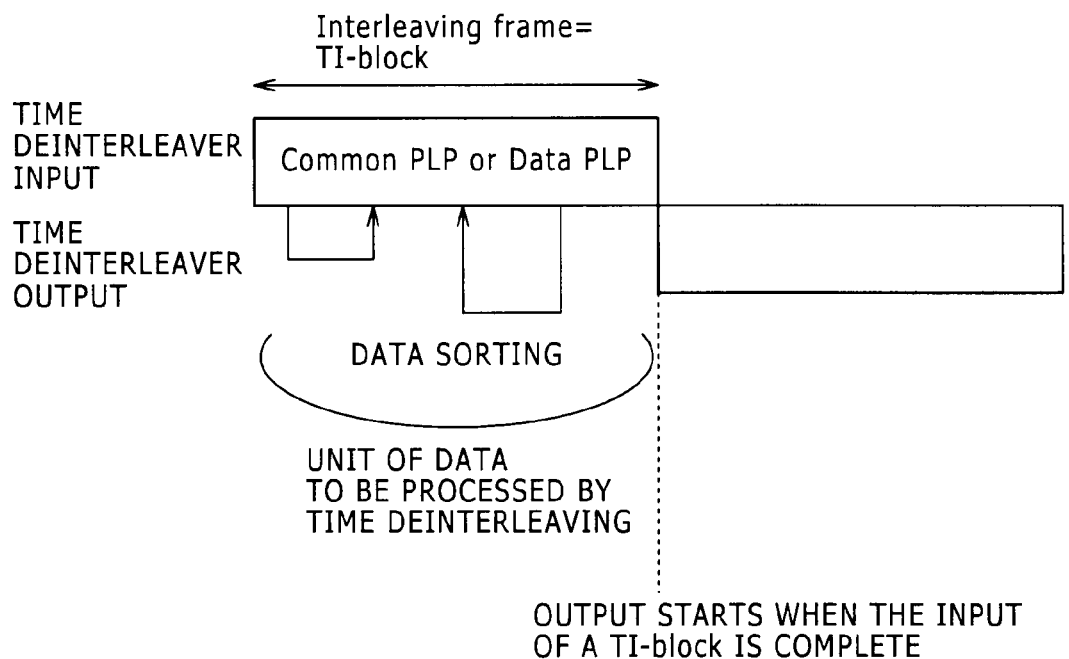
FIG.5
WHEN NTI>1
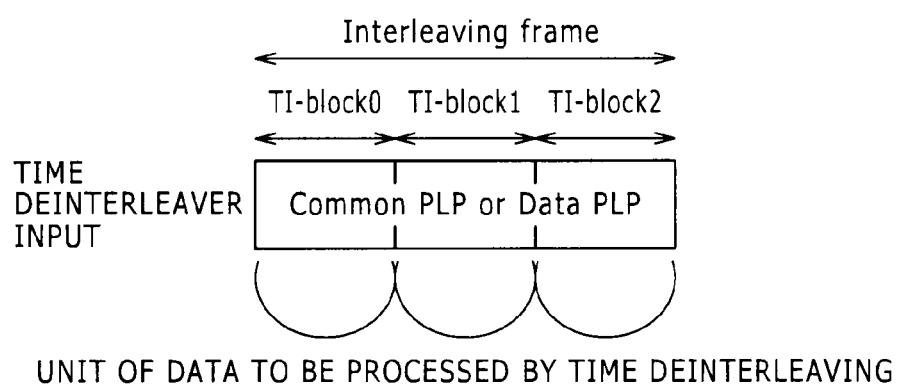
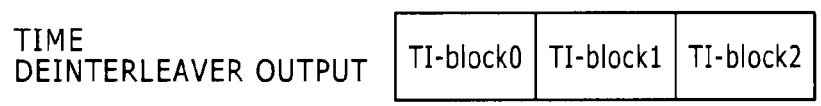

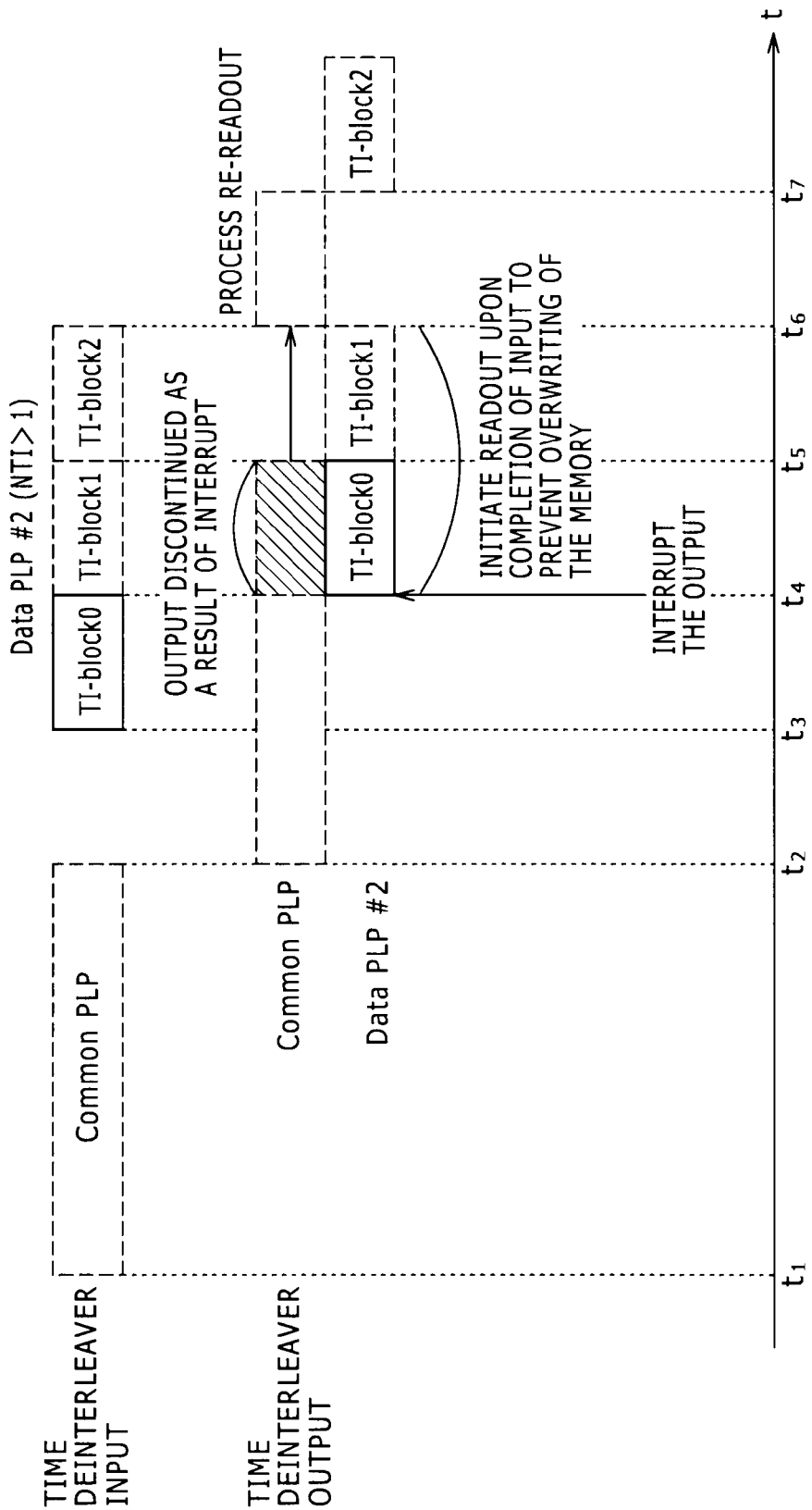

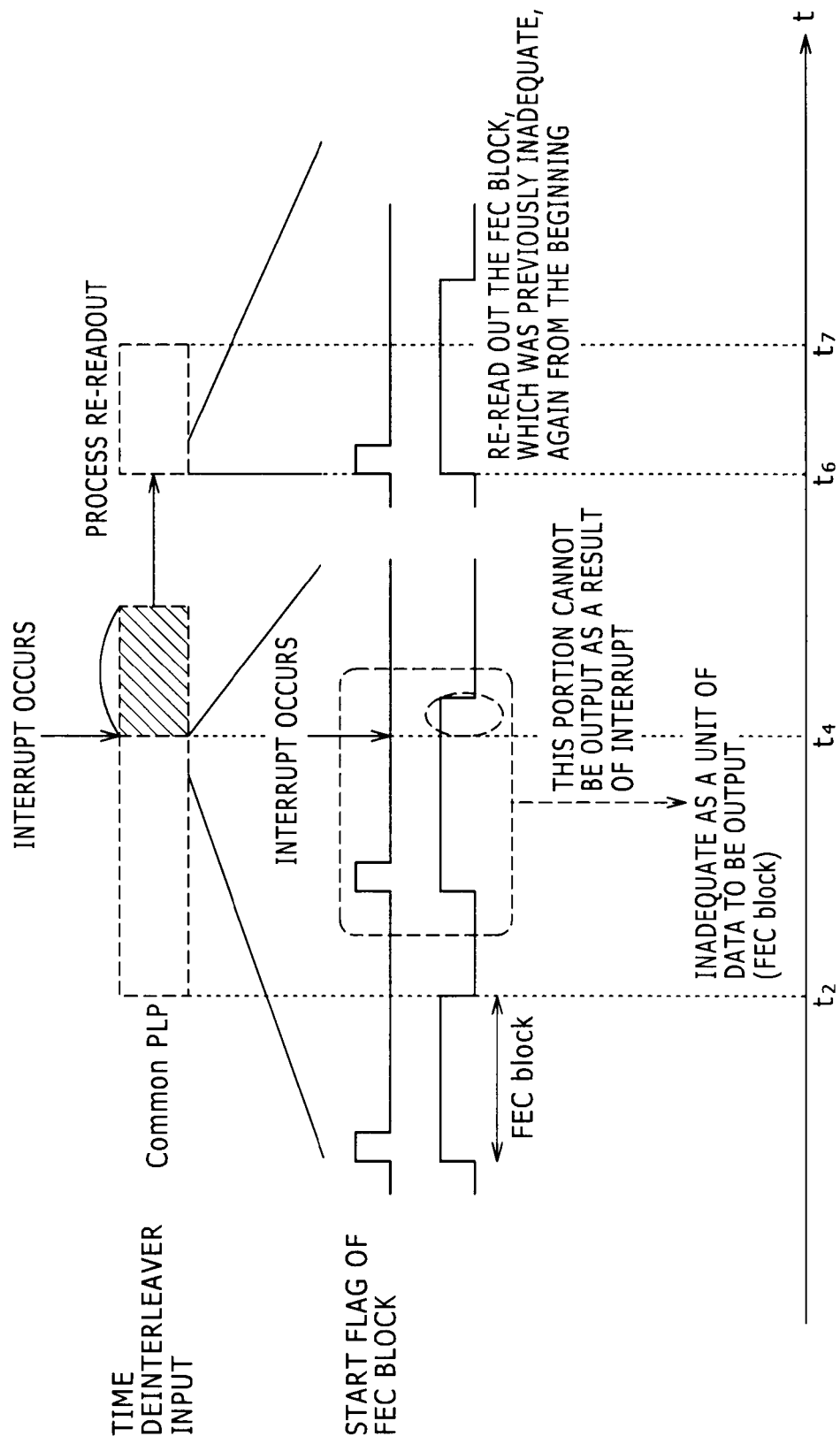

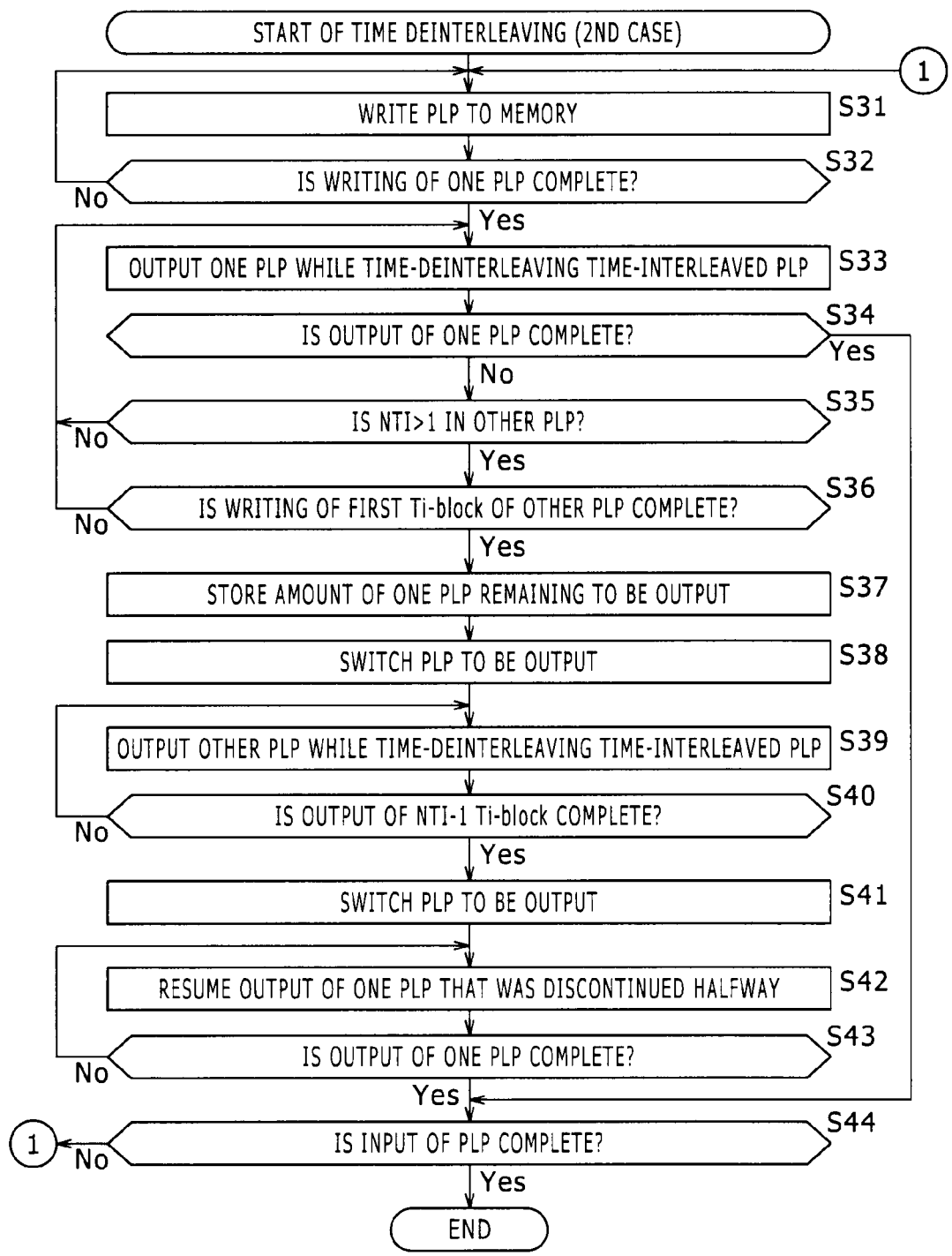

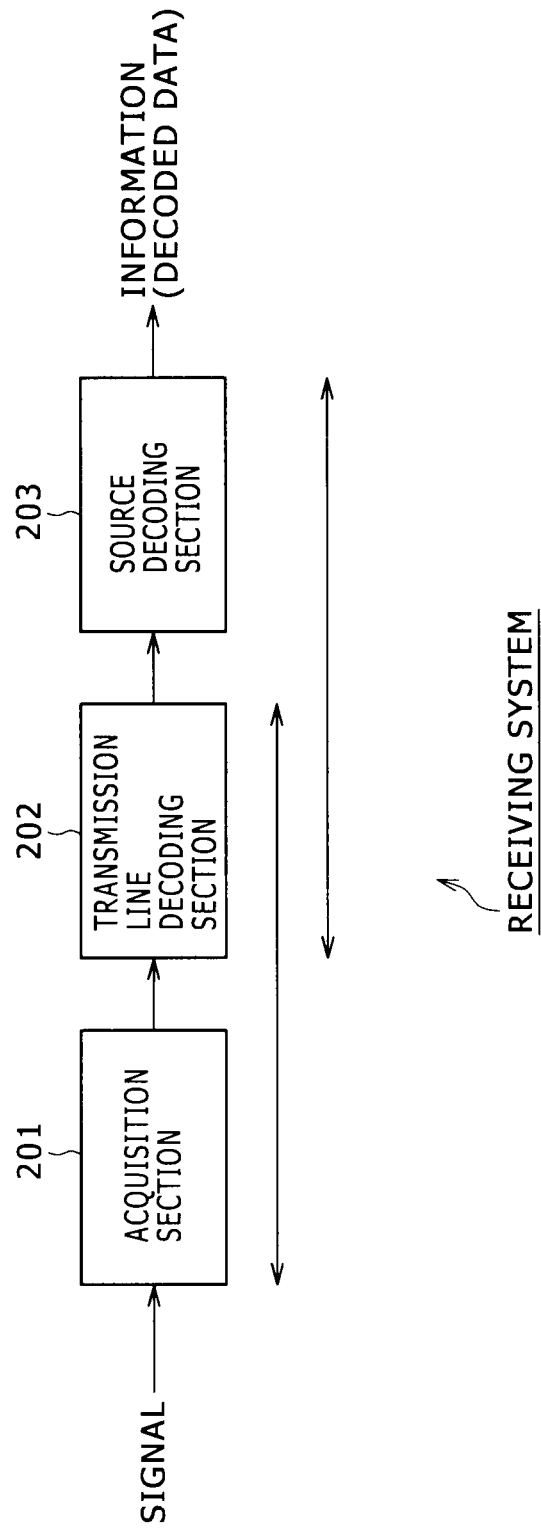

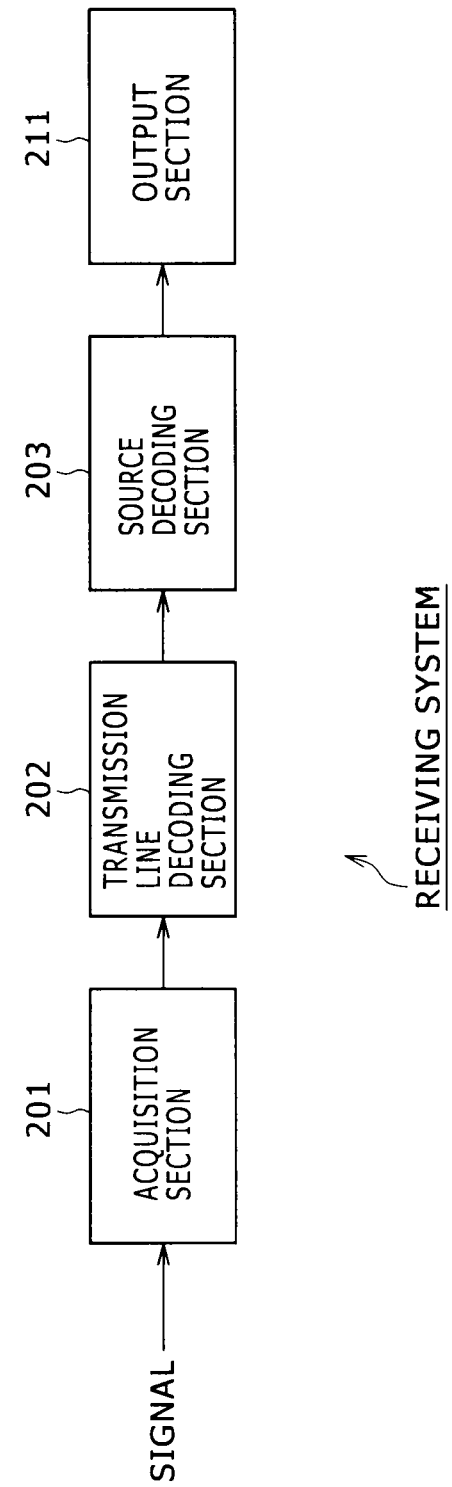

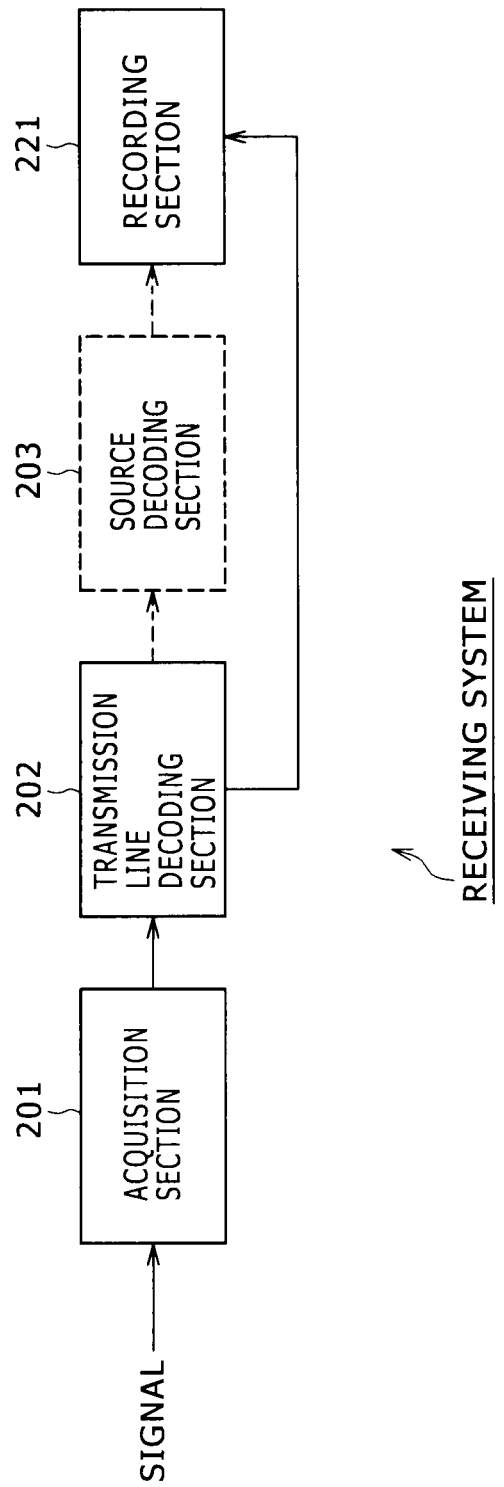

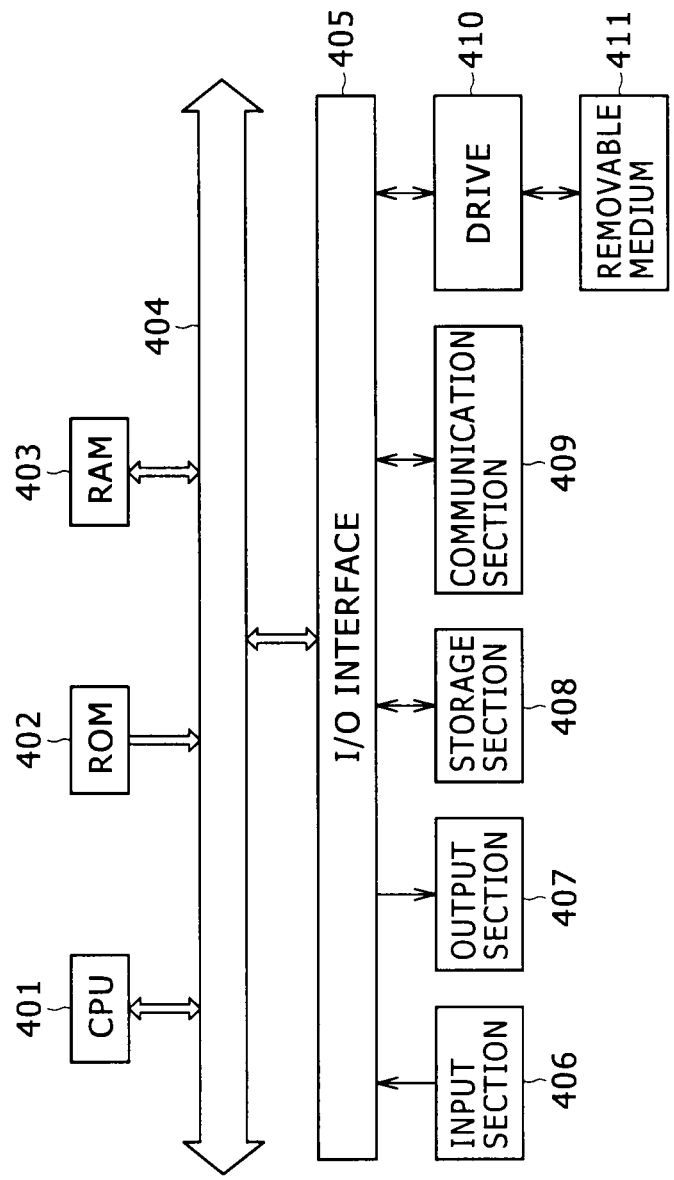

RECEIVER, RECEIVING METHOD, PROGRAM AND RECEIVING SYSTEM

BACKGROUND OF THE INVENTION

1. Field of the Invention

The present invention relates to a receiver, receiving method, program and receiving system, and more particularly, to a receiver, receiving method, program and receiving system whose circuit scale can be reduced.

2. Description of the Related Art

Recent years have seen the use of a modulation scheme called orthogonal frequency division multiplexing (OFDM) for transmitting digital signals. This OFDM is a digital modulation scheme that uses a number of subcarriers orthogonal to each other in a transmission band. Data is assigned to the amplitude and phase of each of the subcarriers. Digital modulation is accomplished by phase shift keying (PSK) or quadrature amplitude modulation (QAM).

The OFDM scheme is often used for terrestrial digital broadcasting that is severely affected by multipath interference. Among terrestrial digital broadcasting standards using OFDM are DVB-T (Digital Video Broadcasting-Terrestrial) and ISDB-T (Integrated Services Digital Broadcasting-Terrestrial).

Incidentally, DVB-T2 (second generation European terrestrial digital broadcasting standard) is on its way to being developed as a terrestrial digital broadcasting standard using OFDM.

It should be noted that DVB-T2 is described in the so-called Blue Book (DVB BlueBook A122) ("Frame structure channel coding and modulation for a second generation digital terrestrial television broadcasting system (DVB-T2)", DVB Document A122 June 2008).

In DVB-T2 (the Blue Book thereof), a frame called a T2 frame is defined so that data is transmitted in units of a T2 frame. A T2 frame contains two preamble signals called P1 and P2. These preamble signals contain information required for processes such as demodulation of an OFDM signal.

In DVB-T2, on the other hand, a scheme called M-PLP (Multiple PLP (Physical Layer Pipes)) is used. With M-PLP, data is transmitted using two types of packet sequences. One of them is a plurality of packet sequences (data packet sequences) called data PLPs. The other is a packet sequence (common packet sequence) called a common PLP. A data PLP includes a packet remaining after a packet (information) common to all of a plurality of original transport streams (each of which will be hereinafter referred to as a TS) has been extracted. A common packet sequence includes a common packet. In other words, a common packet includes a packet common to a plurality of TSs, whereas a data PLP includes a packet specific to one of the plurality of TSs. On the receiving side, an original TS is reconstructed from common and data PLPs.

That is, a data PLP is an individual piece of service information, and a common PLP is a common piece of information extracted from two or more data PLPs. Therefore, the relationship data PLP count≧2× common PLP count≧0 holds. As a result, there is a multiple-to-one relationship between data PLPs and common PLP. For a given common PLP, there are two or more data PLPs. For a given data PLP, there is a common PLP.

FIG. 1 is a diagram illustrating a T2 frame configuration.

When the transmitting side transmits a T2 frame which includes a common PLP, data PLP#1, data PLP#2 and so on with the common PLP being a piece of information common to a plurality of data PLPs, the receiving side proceeds as follows when receiving this T2 frame. That is, if the data PLP#2 is specified, the receiving side selects the data PLP#2 and the common PLP accompanying the data PLP#2 so that the original information can decoded from these selected PLPs.

At the time of decoding, these two PLPs, i.e., the common PLP and data PLP, have to be decoded at the same time. Further, DVB-T2 performs time interleaving to enhance instantaneous noise immunity in the time direction. Time interleaving randomizes data in the time direction.

A time deinterleaver used in DVB-T2 can start its output while at the same time time-deinterleaving the time-interleaved PLP when the input of a predetermined unit of data to be processed is complete. In this time deinterleaver, therefore, the input and output timings are not in a one-to-one correspondence with each other.

An error correction section is provided at the succeeding stage of the time deinterleaver. The error correction section performs error correction on the data that has been sorted by the time deinterleaver.

If two time deinterleavers are provided, one for the common PLP and another for the data PLP, two configurations are possible as illustrated in FIGS. 2A and 2B, one in which two error correction sections are provided, one for each PLP (FIG. 2A) and another in which one error correction section is provided (FIG. 2B) so that it is shared by the two PLPs. Commonly, the configuration shown in FIG. 2B is used in which a single error correction section is shared by the two PLPs for reduced circuit scale and reduced power consumption. Therefore, a description will be given below of a case in which a single error correction section is shared by the two PLPs.

In FIG. 2B, each of the time deinterleavers performs time deinterleaving in units of information to be processed called a TI-block (Time Interleaving block). These time deinterleavers output data to the common error correction section in units of information to be output called an FEC block. The relationship between these units of information to be processed is as shown in FIGS. 3A and 3B.

As illustrated in FIGS. 3A and 3B, one TI-block corresponds to a plurality of FEC blocks. However, when the number of TI-blocks in an interleaving frame is denoted by NTI, this NTI may vary. That is, when NTI=1 as illustrated in FIG. 3A, the interleaving frame is equal to the TI-block. On the other hand, when NTI=3 (NTI>1) as illustrated in FIG. 3B, the interleaving frame contains three TI-blocks. Therefore, the interleaving frame is not equal to the TI-block.

In the case of NTI=1 shown in FIG. 3A, each of the time deinterleavers sorts data in the input PLP (common or data PLP) in units of a TI-block as illustrated in FIG. 4. When NTI=1, the interleaving frame is equal to the TI-block. Each of the time deinterleavers receives a PLP in units of a TI-block. When the input of the TI-block data is complete, each of the time deinterleavers begins its output while at the same time time-deinterleaving the time-interleaved PLP so that the sorted data is output to the common error correction section.

On the other hand, when NTI=3 (NTI>1) as illustrated in FIG. 3B, the interleaving frame is not equal to the TI-block. Therefore, data is sorted in units of each of three TI-blocks or TI-block0, TI-block1 and TI-block2, for a single interleaving frame as illustrated in FIG. 5. However, a memory area available with the time deinterleaver is large enough only for a single TI-block. As a result, as soon as the input of the first TI-block or TI-block0 is complete, the time deinterleaver has to initiate its output. Otherwise, the memory storing the TI-block0 is overwritten by the next TI-block or TI-block1.

In particular, if, while one time deinterleaver outputs a PLP, the other time deinterleaver completes its input of the first TI-block or TI-block0 among the TI-blocks where NTI>1, the other time deinterleaver may not initiate its output because the one time deinterleaver is outputting its data to the common error correction section. This causes the stored TI-block0 to be overwritten, resulting in data loss.

SUMMARY OF THE INVENTION

As described above, if a single error correction section is shared by the outputs of two time deinterleavers, and if, while one time deinterleaver supplies its output to the error correction section, the other time deinterleaver completes its input of a predetermined unit of data to be processed, data loss will take place unless priority is given to the output of the other time deinterleaver.

The present invention has been made in light of the foregoing problem, and it is an aim of the present invention to prevent loss of data output from time deinterleavers to an error correction section so as to allow for sharing of the error correction section by the outputs of the time deinterleavers for reduced circuit scale.

A receiver according to a first mode of the present invention includes receiving means, first and second sorting means and switching means. The receiving means receives an OFDM signal obtained by modulating a common packet sequence and data packet sequence. The common packet sequence is made up of packets common to a plurality of streams. The data packet sequence is made up of packets specific to one of the plurality of streams. The first sorting means sorts the common packet sequence, obtained by demodulating the received OFDM signal, in the time domain. The second sorting means sorts the data packet sequence, obtained by demodulating the received OFDM signal, in the time domain. The switching means switches the output to error correction means adapted to handle error correction from the one sorting means over to the other sorting means if, while the one sorting means supplies its output to the error correction means, the other sorting means completes its input of a predetermined unit of information to be processed.

The switching means switches the output from the one sorting means over to the other sorting means when the input of the first predetermined unit of information to be processed is complete if there are two or more predetermined units of information to be processed of a predetermined frame in the other sorting means.

The switching means switches the output to the error correction means from the other sorting means over to the one sorting means when the output of the predetermined unit of information processed from the other sorting means is complete.

The receiver according to the first mode of the present invention further includes control means adapted to control the output of the one sorting means so that the output from the one sorting means, to which the output has been switched over, resumes from the beginning of the predetermined unit that was terminated incompletely.

The switching means switches the output from the other sorting means over to the one sorting means when there is one predetermined unit of information to be processed left in the other sorting means if there are two or more predetermined units of information to be processed of a predetermined frame in the other sorting means. Then, the switching means switches the output again from the one sorting means over to the other sorting means after the resumed output of information by the one sorting means is complete.

The switching means switches the output from the other sorting means over to the one sorting means when the output of all the units of information processed from the other sorting means is complete if there are two or more predetermined units of information to be processed of a predetermined frame in the other sorting means.

The receiver according to the first mode of the present invention still further includes error correction means adapted to perform error correction on the output of either the first or second sorting means.

The common packet sequence and data packet sequence are respectively a common PLP and data PLP generated from a plurality of pieces of information compliant with M-PLP (Multiple PLP (Physical Layer Pipes)) used in DVB-T2.

A receiving method according to the first mode of the present invention is a receiving method for a receiver that includes receiving means, first and second sorting means and switching means. The receiving method includes a step of the receiving means receiving an OFDM signal obtained by modulating a common packet sequence and data packet sequence. The common packet sequence is made up of packets common to a plurality of streams. The data packet sequence is made up of packets specific to one of the plurality of streams. The receiving method further includes a step of the first sorting means sorting the common packet sequence, obtained by demodulating the received OFDM signal, in the time domain. The receiving method still further includes a step of the second sorting means sorting the data packet sequence, obtained by demodulating the received OFDM signal, in the time domain. The receiving method still further includes a step of the switching means switching the output to error correction means adapted to handle error correction from the one sorting means over to the other sorting means if, while the one sorting means supplies its output to the error correction means, the other sorting means completes its input of a predetermined unit of information to be processed.

A program according to the first mode of the present invention allows for a computer to function as receiving means, first and second sorting means and switching means. The receiving means receives an OFDM signal obtained by modulating a common packet sequence and data packet sequence. The common packet sequence is made up of packets common to a plurality of streams. The data packet sequence is specific to one of the plurality of streams. The first sorting means sorts the common packet sequence, obtained by demodulating the received OFDM signal, in the time domain. The second sorting means sorts the data packet sequence, obtained by demodulating the received OFDM signal, in the time domain. The switching means switches the output to error correction means adapted to handle error correction from the one sorting means over to the other sorting means if, while the one sorting means supplies its output to the error correction means, the other sorting means completes its input of a predetermined unit of information to be processed.

In the first mode of the present invention, an OFDM signal obtained by modulating a common packet sequence and data packet sequence is received. The common packet sequence is made up of packets common to a plurality of streams. The data packet sequence is made up of packets specific to one of the plurality of streams. Error correction is performed on the output of either first or second sorting means. The first sorting means sorts the common packet sequence, obtained by demodulating the received OFDM signal, in the time domain. The second sorting means sorts the data packet sequence, obtained by demodulating the received OFDM signal, in the time domain. The output is switched from the one sorting means over to the other sorting means if, while the one sorting means supplies its output, the other sorting means completes its input of a predetermined unit of information to be processed.

A receiving system according to a second mode of the present invention includes acquisition means and transmission line decoding section. The acquisition means acquires an OFDM signal obtained by modulating a common packet sequence and data packet sequence via a transmission line. The common packet sequence is made up of packets common to a plurality of streams. The data packet sequence is made up of packets specific to one of the plurality of streams. The transmission line decoding section subjects the OFDM signal obtained via the transmission line to transmission line decoding including at least packet sequence decoding. The transmission line decoding section includes first and second sorting means and switching means. The first sorting means sorts the common packet sequence, obtained by demodulating the OFDM signal received via the transmission line, in the time domain. The second sorting means sorts the data packet sequence, obtained by demodulating the OFDM signal, in the time domain. The switching means switches the output to error correction means adapted to handle error correction from the one sorting means over to the other sorting means if, while the one sorting means supplies its output to the error correction means, the other sorting means completes its input of a predetermined unit of information to be processed.

A receiving system according to a third mode of the present invention includes a transmission line decoding section and source decoding section. The transmission line decoding section subjects an OFDM signal, obtained via a transmission line by modulating a common packet sequence and data packet sequence, to transmission line decoding including at least packet sequence decoding. The common packet sequence is made up of packets common to a plurality of streams. The data packet sequence is made up of packets specific to one of the plurality of streams. The source decoding section subjects the OFDM signal that has undergone the transmission line decoding to source decoding including at least decompression of information based on compressed information. The transmission line decoding section includes first and second sorting means and switching means. The first sorting means sorts the common packet sequence, obtained by demodulating the received OFDM signal, in the time domain. The second sorting means sorts the data packet sequence, obtained by demodulating the received OFDM signal, in the time domain. The switching means switches the output to error correction means adapted to handle error correction from the one sorting means over to the other sorting means if, while the one sorting means supplies its output to the error correction means, the other sorting means completes its input of a predetermined unit of information to be processed.

A receiving system according to a fourth mode of the present invention includes a transmission line decoding section and output section. The transmission line decoding section subjects an OFDM signal, obtained via a transmission line by modulating a common packet sequence and data packet sequence, to transmission line decoding including at least packet sequence decoding. The common packet sequence is made up of packets common to a plurality of streams. The data packet sequence is made up of packets specific to one of the plurality of streams. The output section outputs an image or sound based on the OFDM signal that has undergone the transmission line decoding. The transmission line decoding section includes first and second sorting means and switching means. The first sorting means sorts the common packet sequence, obtained by demodulating the received OFDM signal, in the time domain. The second sorting means sorts the data packet sequence, obtained by demodulating the received OFDM signal, in the time domain. The switching means switches the output to error correction means adapted to handle error correction from the one sorting means over to the other sorting means if, while the one sorting means supplies its output to the error correction means, the other sorting means completes its input of a predetermined unit of information to be processed.

A receiving system according to a fifth mode of the present invention includes a transmission line decoding section and recording section. The transmission line decoding section subjects an OFDM signal, obtained via a transmission line by modulating a common packet sequence and data packet sequence, to transmission line decoding including at least packet sequence decoding. The common packet sequence is made up of packets common to a plurality of streams. The data packet sequence is specific to one of the plurality of streams. The recording section records the OFDM signal that has undergone the transmission line decoding. The transmission line decoding section includes first and second sorting means and switching means. The first sorting means sorts the common packet sequence, obtained by demodulating the received OFDM signal, in the time domain. The second sorting means sorts the data packet sequence, obtained by demodulating the received OFDM signal, in the time domain. The switching means switches the output to error correction means adapted to handle error correction from the one sorting means over to the other sorting means if, while the one sorting means supplies its output to the error correction means, the other sorting means completes its input of a predetermined unit of information to be processed.

In the second to fifth modes of the present invention, an OFDM signal, obtained by modulating a common packet sequence and data packet sequence, is subjected to transmission line decoding. The common packet sequence is made up of packets common to a plurality of streams. The data packet sequence is made up of packets specific to one of the plurality of streams. Error correction is performed on the output of either first or second sorting means. The first sorting means sorts the common packet sequence in the time domain. The second sorting means sorts the data packet sequence in the time domain. The output is switched from the one sorting means over to the other sorting means if, while the one sorting means supplies its output, the other sorting means completes its input of a predetermined unit of information to be processed.

As described above, the present invention contributes to reduced circuit scale.

BRIEF DESCRIPTION OF THE DRAWINGS

FIGS. 3A and 33 are diagrams describing units of information to be processed;

FIG. 4 is a diagram illustrating the output of the time deinterleaver (NTI=1);

FIG. 5 is a diagram illustrating the output of the time deinterleaver (NTI>1);

FIG. 9 is a timing diagram describing output interrupt;

FIG. 10 is a timing diagram describing output reversing during re-readout;

FIG. 11 is a flowchart describing time deinterleaving (second case);

FIG. 12 is a diagram illustrating a configuration example of a first embodiment of a receiving system to which the present invention is applied;

FIG. 13 is a diagram illustrating a configuration example of a second embodiment of the receiving system to which the present invention is applied;

FIG. 14 is a diagram illustrating a configuration example of a third embodiment of the receiving system to which the present invention is applied; and FIG. 15 is a diagram illustrating a configuration example of computer hardware.

DETAILED DESCRIPTION OF THE PREFERRED EMBODIMENTS

A description will be given below of embodiments of the present invention with reference to the accompanying drawings.

[Configuration Example of the Receiver]

Figure 1:
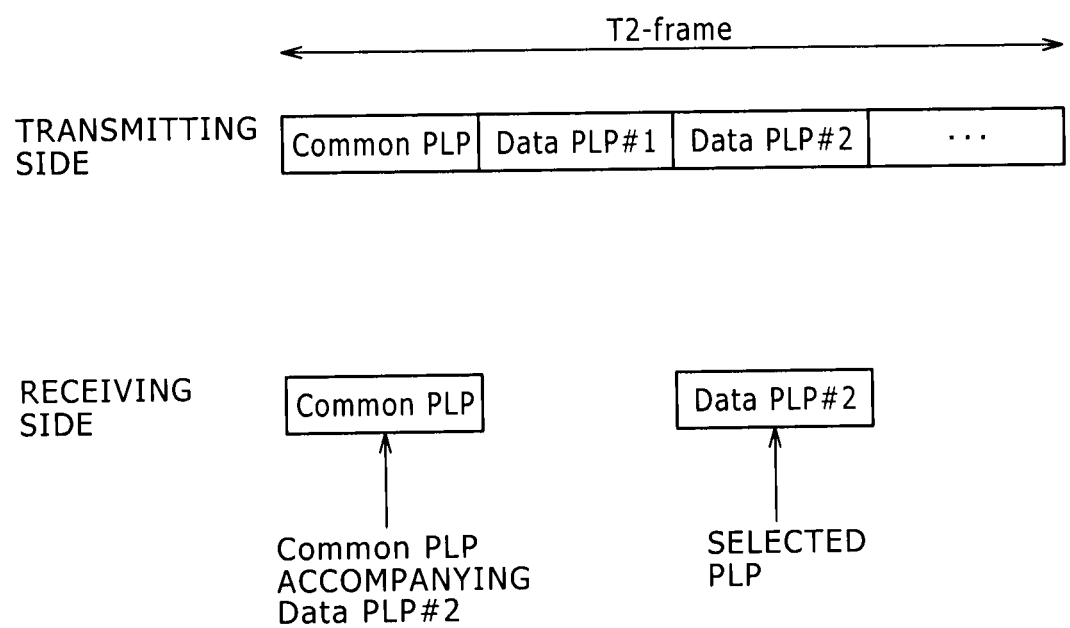
FIG. 1 is a diagram illustrating a T2 frame configuration.
Figure 2A:
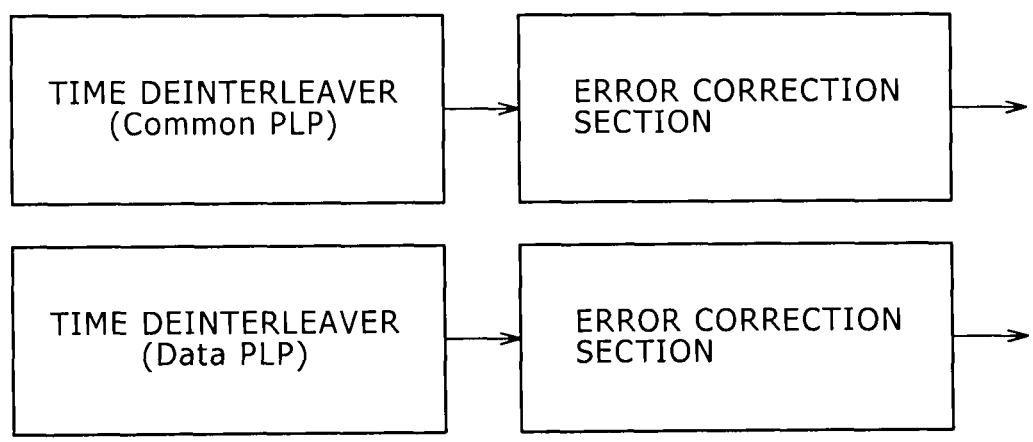
FIGS. 2A and 2B are diagrams describing configurations of a time deinterleaver and error correction section.
Figure 2B:
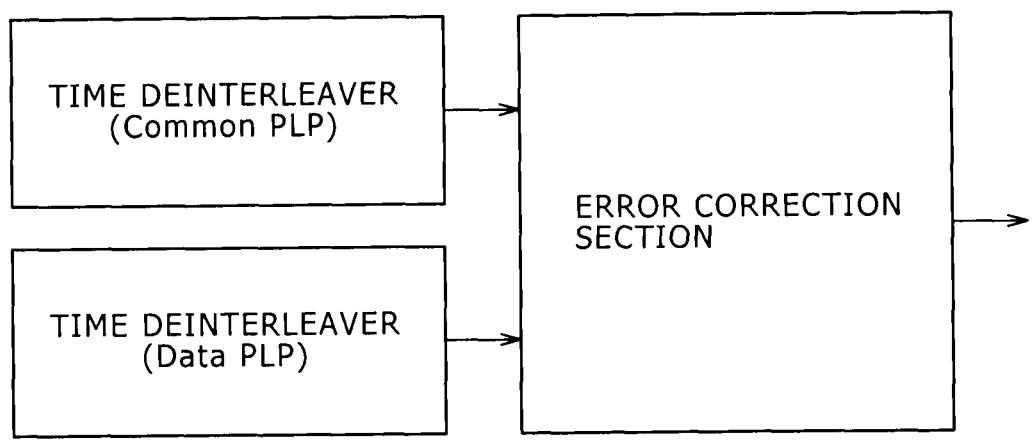
Figure 3A:
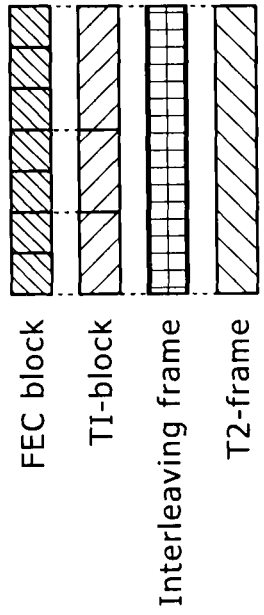
Figure 3B:
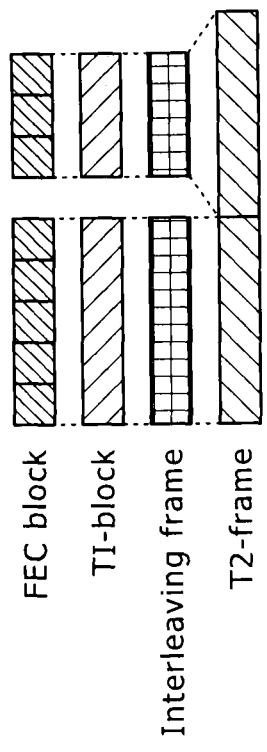
Figure 6:
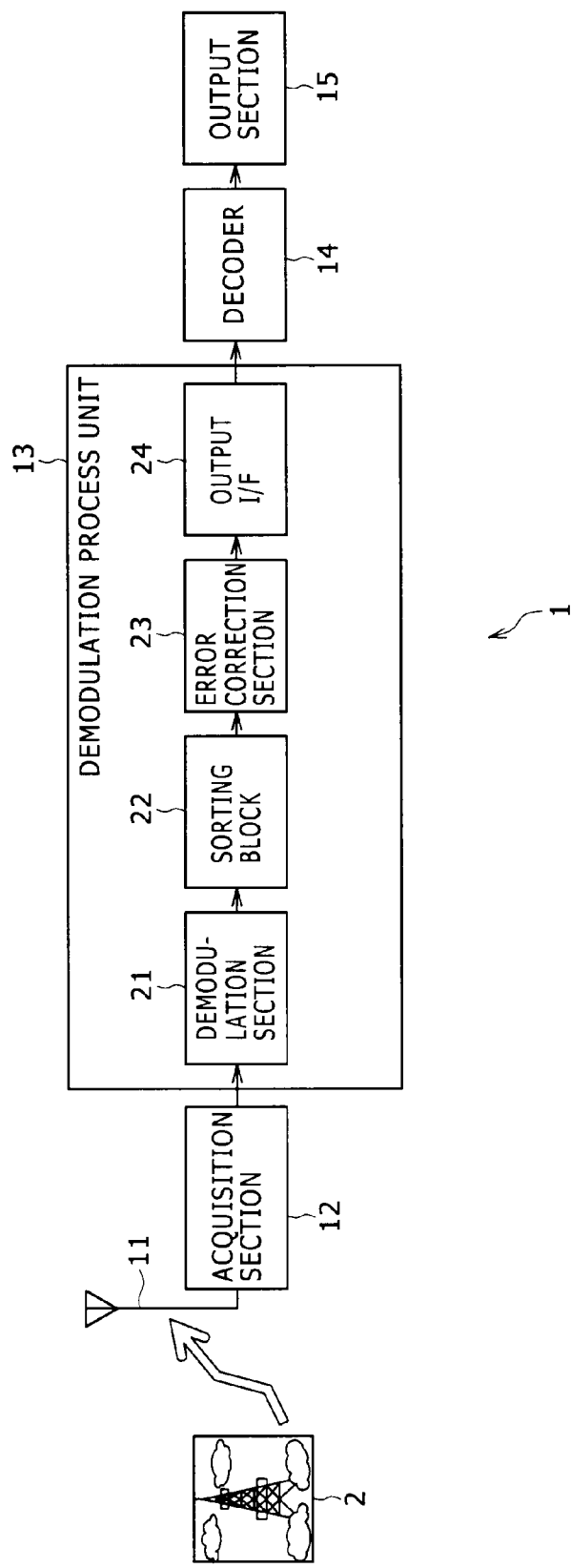
FIG. 6 is a diagram illustrating an embodiment of a receiver to which the present invention is applied.

FIG. 6 is a diagram illustrating an embodiment of a receiver to which the present invention is applied.

A receiver 1 shown in FIG. 6 receives a digital broadcasting signal from a transmitter 2. This signal is an OFDM signal obtained by subjecting PLPs, generated from TSs to the processes such as error correction and OFDM modulation by means of M-PLP. M-PLP is a scheme used in the DVB-T2 standard which is being developed as the next generation of a terrestrial digital broadcasting standard.

That is, the transmitter 2 used, for example, in a broadcasting station, transmits a digital broadcasting OFDM signal over a transmission line. The receiver 1 receives an OFDM signal from the transmitter 2, decodes the signal and outputs the decoded data obtained from decoding to the device at the subsequent stage. Decoding includes demodulation and error correction.

In the example shown in FIG. 6, the receiver 1 includes an antenna 11, acquisition section 12, demodulation process unit 13, decoder 14 and output section 15.

The antenna 11 receives an OFDM signal from the transmitter 2 over a transmission line, supplying the signal to the acquisition section 12.

The acquisition section 12 includes, for example, a tuner or set-top box (STB). The same section 12 frequency-converts the OFDM signal (RF signal) received by the antenna 11 to an IF (Intermediate Frequency) signal, supplying the resultant signal to the demodulation process unit 13.

The demodulation process unit 13 reconstructs a TS from the PLP obtained by subjecting the OFDM signal from the acquisition section 12 to necessary processes such as demodulation and error correction, supplying the TS to the decoder 14.

That is, the demodulation process unit 13 includes a demodulation section 21, sorting block 22, error correction section 23 and output interface (I/F) 24.

The demodulation section 21 demodulates the OFDM signal supplied from the acquisition section 12, supplying the demodulated signal obtained from the demodulation to the sorting block 22.

The sorting block 22 extracts the specified data PLP and the common PLP associated therewith from the demodulated signal supplied from the demodulation section 21 and subjects the PLPs to predetermined sorting, supplying the PLPs to the error correction section 23.

The error correction section 23 subjects the PLP (data or common PLP), which is supplied from the sorting block 22 and has undergone the sorting, to a predetermined error correction, outputting the resultant PLP to the output I/F 24.

Here, the transmitter 2 transmits, for example as an OFDM signal, PLPs that are generated from TSs. These TSs are made up of TS packets containing MPEG (Moving Picture Experts Group)-coded data. This MPEG-coded data is produced by MPEG-coding video and audio data as a program.

Further, the transmitter 2 codes PLPs, for example, into RS (Reed Solomon) or LDPC (Low Density Parity Check) codes as a countermeasure against errors that may take place on a transmission line. Therefore, the error correction section 23 decodes these codes as an error correction coding process.

The output I/F 24 reconstructs the TS from the PLP supplied from the error correction section 23, outputting the reconstructed TS to external equipment at a predetermined rate.

The decoder 14 MPEG-decodes the MPEG-coded data contained in the TS supplied from the output I/F 24, supplying the video and audio data, obtained from the MPEG decoding, to the output section 15.

The output section 15 includes, for example, a display and speaker and displays an image and produces a sound in accordance with the video and audio data supplied from the decoder.

The receiver 1 is configured as described above.

[Configuration Example of the Sorting Block]

Figure 7:
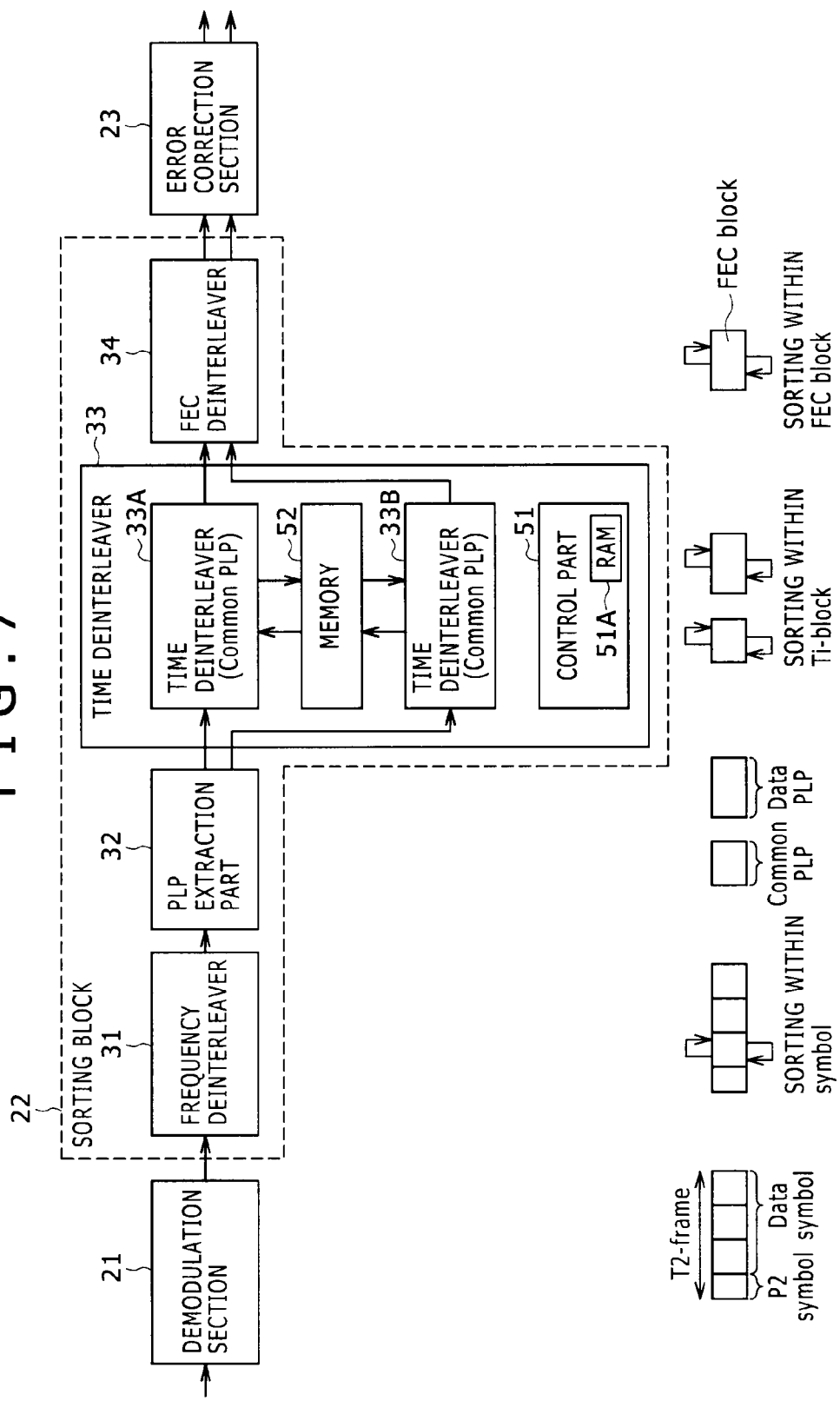
FIG. 7 is a diagram illustrating a detailed configuration of a sorting block.

FIG. 7 is a diagram illustrating a detailed configuration of the sorting block 22 shown in FIG. 6.

In FIG. 7, a data structure is shown under each of the blocks to describe the details of the process performed in the associated block. These data structures will be referred to as appropriate for the description of the processes.

As illustrated in FIG. 7, the sorting block 22 includes a frequency deinterleaver 31, PLP extraction part 32, time deinterleaver 33 and FEC deinterleaver 34.

The demodulation performed by the demodulation section 21 is performed in units of a T2 frame as described above. This T2 frame contains a P1 symbol (not shown), P2 symbol and data symbol in this order. The two types of preambles called P1 and P2 contain information required for demodulation of the OFDM signal and other processes.

A P1 symbol is designed to transmit P1 signalling. On the other hand, a P2 symbol is designed to transmit L1 pre-signalling and L1 post-signalling.

L1 pre-signalling contains information required for a receiver adapted to receive a T2 frame to receive and decode L1 post-signalling. L1 post-signalling contains parameters required for a receiver to access the physical layer (or its pipes). Further, L1 post-signalling contains information required to decode common and data PLPs (hereinafter referred to as PLP information). That is, if PLP information on common and data PLPs associated with an intended service is detected from L1 post-signalling, the data and common PLPs in the data symbol associated with the detected PLP information are selected and decoded.

That is, first of all, the demodulation section 21 adapted to demodulate an OFDM signal used in DVB-T2 proceeds, for example, with the demodulation of P1 signalling in the T2 frame, in which P1 has been detected, during a so-called channel line scan. Then, the demodulation section 21 performs predetermined calculations related to P2. When it becomes possible to demodulate L1 pre-signalling contained in P2, data can be demodulated from this point in time onward. The demodulated signal obtained from this demodulation is supplied to the sorting block 22.

In the sorting block 22, the frequency deinterleaver 31 performs frequency deinterleaving by sorting data of the demodulated signal supplied from the demodulation section 21 in the frequency domain according to a predetermined rule using an unshown memory as a work area. The demodulated signal whose data has been sorted within the symbol by this frequency deinterleaving is supplied to the PLP extraction part 32.

The PLP extraction part 32 extracts the specified data PLP and the common PLP associated therewith from the demodulated signal supplied from the frequency deinterleaver 31 based on the PLP information detected by the demodulation section 21, supplying the extracted data to the time deinterleaver 33.

The time deinterleaver 33 includes a time deinterleaver 33A, time deinterleaver 33B, control part 51 and memory 52.

The time deinterleaver 33A performs time deinterleaving by sorting the data of the common PLP extracted from the PLP extraction part 32 in the time domain according to a predetermined rule using the memory 52 such as a RAM (Random Access Memory) as a work area. The common PLP that has undergone time deinterleaving is supplied to the FEC deinterleaver 34.

The time deinterleaver 33B performs time deinterleaving by sorting the data of the data PLP extracted from the PLP extraction part 32 in the time domain according to a predetermined rule using the memory 52 as a work area as does the time deinterleaver 33A. The processing result is supplied to the FEC deinterleaver 34.

The control part 51 controls the time deinterleavers 33A and 33B to perform time deinterleaving. It should be noted that a RAM 51A is provided in the control part 51 so that information required for time deinterleaving is stored as appropriate.

As the control part 51 controls the time deinterleavers 33A and 33B associated with the respective PLPs, the time deinterleaver 33A starts its output while at the same time time-deinterleaving the time-interleaved common PLP when the input of a predetermined TI-block of the common PLP, which is supplied in units of a TI-block, is complete. Similarly, the time deinterleaver 33B starts its output while at the same time time-deinterleaving the time-interleaved data PLP when the input of a predetermined TI-block of the data PLP, which is supplied in units of a TI-block, is complete.

The control part 51 switches the output of the time deinterleaver 33A over to that of the time deinterleaver 33B under the following condition. That is, the control part 51 switches the output if, while the time deinterleaver 33A supplies its output, the time deinterleaver 33B completes its writing of the first TI-block to the memory 52 when there are NTI (where NTI>1) TI-blocks in the data PLP of the time deinterleaver 33B. At this time, the control part 51 stores, for example, information indicating the amount of the PLP remaining to be output as information required to resume the output of the time deinterleaver 33A (hereinafter referred to as resumption information) that was discontinued halfway.

The control part 51 permits the time deinterleaver 33B to output the TI-blocks with priority until the output of the (NTI-1) or NTI TI-blocks is complete. Thereafter, when the output of the (NTI-1) or NTI TI-blocks is complete, the control part 51 switches the output of the time deinterleaver 33B that has been outputting the TI-blocks with priority over to that of the time deinterleaver 33A that was discontinued halfway. Then, the control part 51 allows for the time deinterleaver 33A to resume the readout of the common PLP that was discontinued previously.

Thanks to the output control of the control part 51, either the common or data PLP is supplied to the FEC deinterleaver 34 in units of an FFC block.

If, contrary to the relationship described above, and while the time deinterleaver 33B supplies its output, the time deinterleaver 33A completes the writing of the first TI-block to the memory 52 when there are NTI (where NTI>1) TI-blocks in the common PLP of the time deinterleaver 33A, the time deinterleavers 33A and 33B merely play opposite roles to those described above. Therefore, the processes performed by the time deinterleavers under the control of the control part 51 remain unchanged.

The FEC deinterleaver 34 performs FEC deinterleaving by sorting the data of the common or data PLP output from the time deinterleaver 33 in units of an FEC block according to a predetermined rule using an unshown memory as a work area. The common or data PLP whose data has been sorted in the FEC block is supplied to the error correction section 23.

The error correction section 23 is supplied with the common or data PLP signal in units of an FEC block from the time deinterleaver 33 via the FEC deinterleaver 34 under the output control of the control part 51. The error correction section 23 is shared by the common and data PLPs. Depending on which of the common and data PLPs is input, the same section 23 performs error correction on the common or data PLP.

[Description of the Time Deinterleaving]

Figure 8:
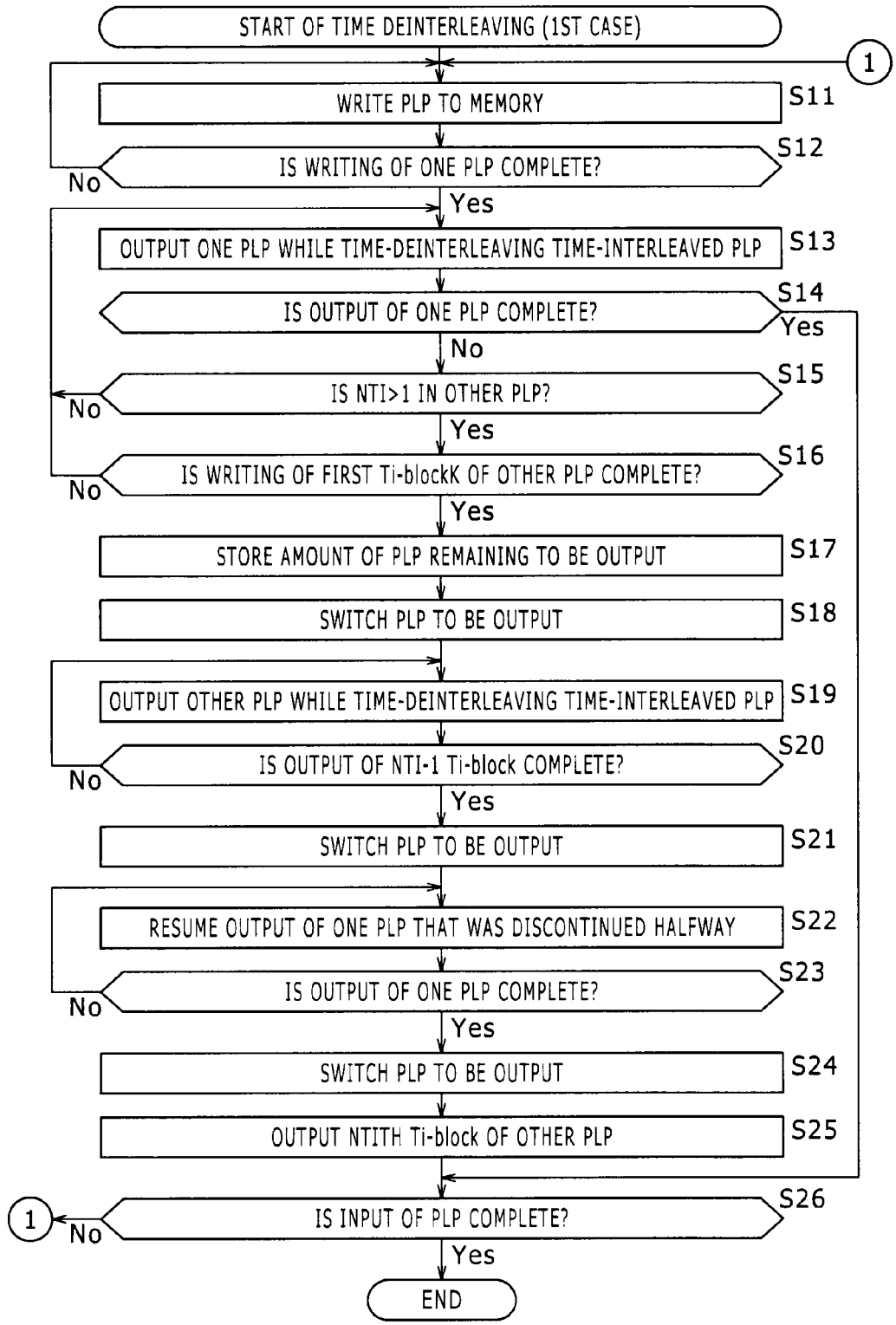
FIG. 8 is a flowchart describing time deinterleaving (first case)

FIG. 8 is a flowchart describing time deinterleaving (first case) performed by the time deinterleaver 33.

In the description of FIG. 8, the expressions "one PLP" and "other PLP" are intended to mean that both common and data PLPs are acceptable.

That is, when the common PLP is "one PLP," the data PLP is "other PLP." In this case, the time deinterleaver 33A, i.e., one time deinterleaver, performs time deinterleaving on the common PLP, i.e., one PLP, and the time deinterleaver 33B, i.e., other time deinterleaver, performs time deinterleaving on the data PLP, i.e., other PLP. In contrast, when the data PLP is "one PLP", the common PLP is "other PLP." In this case, the time deinterleaver 33B, i.e., one time deinterleaver, performs time deinterleaving on the data PLP, i.e., one PLP, and the time deinterleaver 33A, i.e., other time deinterleaver, performs time deinterleaving on the common PLP, i.e., other PLP.

In step S11, the control part 51 causes the time deinterleaver to write a common or data PLP, which has been input following OFDM demodulation, to the memory 52. In step S12, the control part 51 determines whether the writing of the common or data PLP to the memory 52 is complete.

In step S12, if the control part 51 determines that the writing to the memory 52 is not complete, the process returns to step S11 where the control part 51 repeats its determination in step S12 until the writing of one PLP is complete.

On the other hand, when the control part 51 determines that the writing of one PLP is complete in step S12, the one time deinterleaver 33 performs time deinterleaving by sorting the data of the one PLP that has been written to the memory 52 in the time domain according to a predetermined rule.

In step S14, the control part 51 determines whether the output of the one PLP is complete. When the control part 51 determines that the output of the one PLP is complete, the process proceeds to step S26 where the control part 51 determines whether a next PLP has been input.

On the other hand, if the control part 51 determines in step S14 that the output of the one PLP is not complete, the control part 51 determines in step S15 whether NTI is greater than 1 for the other PLP. When the control part 51 determines in step S15 that NTI is greater than 1 for the other PLP, the same section 51 determines in step S16 whether the writing of the first TI-block of the other PLP with NTI greater than 1 to the memory 52 is complete.

If the control part 51 determines that NTI is not greater than 1 in the other PLP (No in step S15), or if the same section 51 determines that the writing of the first TI-block of the other PLP is not complete (No in step S16), the output of the one PLP continues. Therefore, the process returns to step S13 where the output of the one PLP is repeated.

On the other hand, when the control part 51 determines in step S16 that the writing of the first TI-block of the other PLP is complete, the same section 51 stores resumption information such as the amount of the PLP remaining to be output in the RAM 51A and switches the PLP to be output to the error correction section 23 from the one PLP over to the other PLP in step S18.

In step S19, the other time deinterleaver 33 performs time deinterleaving by sorting the data of the other PLP that has been written to the memory 52 in the time domain according to a predetermined rule.

The control part 51 determines in step S20 whether the output of the NTI-1 TI-blocks is complete as a result of the time deinterleaving on the other PLP. If the control part 51 determines that the output of the NTI-1 TI-blocks is not complete, the process returns to step S19 where the output of the one PLP is repeated.

On the other hand, when the control part 51 determines in step S20 that the output of the NTI-1 TI-blocks is complete, the same section 51 switches the PLP to be output from the other PLP over to the one PLP in step S21. Then, the control part 51 reads out the resumption information from the RAM 51A and causes the output of the other PLP, which was discontinued halfway, to be resumed in step S22. This allows for the one time deinterleaver 33 to perform time deinterleaving on the remaining one PLP and resume the output thereof.

It should be noted that, as described earlier, the time deinterleavers 33 output the PLPs in units of an FEC block. Therefore, if the output is discontinued halfway through an FEC block, the FEC block has to be read out from the beginning again. A detailed description thereof will be given later with reference to FIG. 10.

The control part 51 determines in step S23 whether the output of the one PLP is complete. If the same section 51 determines that the output of the one PLP is not complete, the process returns to step S22 where the output of the one PLP is repeated.

On the other hand, when the control part 51 determines that the output of the one PLP is complete, the same section 51 switches the PLP to be output again from the one PLP over to the other PLP in step S24. Then, the other time deinterleaver 33 performs time deinterleaving in step S25 by sorting the data of the NTI TI-blocks of the other PLP that have been written to the memory 52 in the time domain according to a predetermined rule.

In step S26, the control part 51 determines whether the input of a PLP is complete. If the same section 51 determines that the input of a PLP is not complete, the process returns to step S11 where the above-described time deinterleaving is repeated.

On the other hand, if control part 51 determines in step S26 that the input of a PLP is complete, the time deinterleaving is terminated.

The time deinterleaving is performed as described above.

A description will be given next of the time deinterleaving described with reference to the flowchart shown in FIG. 8 in a more detailed manner with reference to the timing diagrams shown in FIGS. 9 and 10.

FIG. 9 is a timing diagram describing output interrupt (corresponding to the process in step S16 of FIG. 8) during time deinterleaving. It should be noted that time elapses from left to right in FIG. 9.

As illustrated in FIG. 9, the input of a common PLP begins from time $t_1$. When the writing of a TI-block to the memory 52 is complete at time $t_2$, the time deinterleaver 33A sorts the data in the TI-block in the time domain according to a predetermined rule and begins its output in units of an FEC block.

At time $t_3$ when the time deinterleaver 33A outputs the TI-block, the input of a data PLP with NTI=3 to the time deinterleaver 33B begins. As a result, the writing of the first TI-block, i.e., TI-block0, is complete at time $t_4$. However, it has been repeatedly mentioned that, in this condition, the written TI-block0 is overwritten by the TI-block1 that is input as the second TI-block. At time $t_4$, for this reason, the control part 51 switches the output of the time deinterleaver 33A over to that of the time deinterleaver 33B, interrupting the output of the TI-block of the common PLP to output the TI-block0 of the data PLP.

As a result, the time deinterleaver 33B processes the output of the TI-block0 with priority, sorting the data of the TI-block0 in the time domain according to a predetermined rule and outputting the TI-block0 with sorted data. On the other hand, the output of the TI-block of the common PLP that has been interrupted is discontinued temporarily at time $t_4$. However, the resumption information such as the amount of the PLP remaining to be output is stored in the RAM 51A.

Then, while the TI-block0 is output, the TI-block1, i.e., the second TI-block, is written to the memory 52. At time $t_5$, the writing of the TI-block1 is complete simultaneously with the end of the output of the TI-block0. At this time, therefore, the output of the TI-block1 begins. Thus, the TI-block0 and TI-block1 are output in an orderly manner, thus preventing the memory 52 from being overwritten. However, NTI=3 in the data PLP. Therefore, the output of the TI-block of the common PLP is resumed when the output of the second TI-block (NTI=3−1=2) is complete. That is, the output of the TI-block1 is complete at time $t_6$. As a result, the control part 51 switches the output of the time deinterleaver 33B over to that of the time deinterleaver 33A before initiating the output of the third TI-block, i.e., TI-block2, resuming the output of the TI-block of the common PLP (process in step S22 of FIG. 8).

When the output of the one PLP is resumed, the readout is resumed from the position specified by the resumption information stored in the RAM 51A. However, the time deinterleavers 33 output the PLPs in units of an FEC block. Therefore, the one PLP has to be output accordingly. That is, if the output is discontinued halfway through an FEC block, resuming the readout from where the output is discontinued results in failure of a portion of the FEC block to be output due to the interrupt.

The timing diagram of FIG. 10 shows the relationship between the output of the time deinterleaver 33A and the FEC block when an interrupt occurs at time $t_4$. If the output is resumed from where the interrupt occurs, the unit of data to be output (FEC block) is incomplete. Therefore, the control part 51 ensures that the FEC block is read out again from the beginning rather than from halfway based on the start flag of the FEC block during the re-readout. This allows for the complete FEC block to be output as if the output is rewound.

Referring back to FIG. 9, when the resumed output of the TI-block of the common PLP is complete at time $t_7$, the control part switches the output of the time deinterleaver 33A over to that of the time deinterleaver 33B again, allowing the remaining TI-block2, i.e., the third TI-block, to be read out and output (process in step S25 of FIG. 8).

As described above, if, while the output of the one PLP is in progress, the writing of the first TI-block of the other PLP to the memory 52 is complete when there are NTI (where NTI>1) TI-blocks in the other PLP, the output of the one PLP is switched over to the output of the other PLP. This prevents the first TI-block from being overwritten, thus preventing data loss (memory failure).

As a result, the error correction section 23 can be shared by the common and data PLPs, thus providing reduced circuit scale and reduced power consumption.

Incidentally, the first case of time deinterleaving was described as follows with reference to the flowchart of FIG. 8. That is, if, while the output of the one PLP is in progress, the other PLP with NTI>1 is input, the output of the one PLP is switched over to the output of the other PLP. Then, when the output of one of the NTI-1 TI-blocks is complete, the output of the other PLP is switched over to the output of the one PLP. However, the output of the other PLP may be switched over to the output of the one PLP after the output of the NTI TI-blocks is complete.

A description will be given next of a second case of the time deinterleaving in which the output of the other PLP is switched over to the output of the one PLP after the output of the NTI TI-blocks is complete with reference to the flowchart shown in FIG. 11.

In steps S31 to S39 of FIG. 11, if, while the output of the one PLP is in progress, the other PLP with NTI>1 is input, the output of the one PLP is switched over to the output of the other PLP, allowing time deinterleaving to be performed on the other PLP as with steps S11 to S19 of FIG. 8.

The control part 51 determines in step S40 whether the output of the NTI-1 TI-blocks is complete as a result of the time deinterleaving on the other PLP. If the control part 51 determines in step S40 that the output of the NTI-1 TI-blocks is not complete, that is, if NTI=3, the output of three (NTI=3) TI-blocks has yet to be complete. Therefore, the process returns to step S39 where the output of the other PLP by the other time deinterleaver 33 is repeated.

On the other hand, when the control part 51 determines in step S40 that the output of the NTI-1 TI-blocks is complete, the same section 51 switches the PLP to be output from the other PLP over to the one PLP. Then, the same section 51 reads out the resumption information of the one PLP from the RAM 51A in step S42, resuming the output of the one PLP that was discontinued halfway.

The control part 51 determines in step S43 whether the output of the one PLP is complete. If the same section 51 determines that the output thereof is not complete, the process returns to step S42 where the output of the one PLP by the one time deinterleaver 33 is repeated.

On the other hand, when the control part 51 determines in step S43 that the output of the one PLP is complete, the same section 51 determines in step S44 whether the input of a PLP is complete as with step S26 of FIG. 8. When the same section 51 determines that the input of a PLP is complete, the time deinterleaving is terminated.

Thus, it is possible to prevent the overwriting of a TI-block by ensuring that a TI-block that has yet to be output is not overwritten by the next TI-block or that all the TI-blocks are output, as after the completion of output of NTI-1 or NTI TI-blocks. Further, resuming the output by determining whether the output of NTI TI-blocks is complete ensures a smaller number of times the output is switched than resuming the output by determining whether the output of NTI-1 TI-blocks is complete because the former eliminates the need to switch over to the output of the other PLP after the completion of the resumed output.

[Configuration Example of the Receiving System]

A description will be given next of the configuration of a receiving system with reference to FIGS. 12 to 14.

FIG. 12 is a diagram illustrating a configuration example of a first embodiment of a receiving system to which the present invention is applied.

In FIG. 12, the receiving system includes an acquisition section 201, transmission line decoding section 202 and source decoding section 203.

The acquisition section 201 acquires an OFDM signal compliant with M-PLP used in DVB-T2 via an unshown transmission line such as terrestrial digital broadcasting, satellite digital broadcasting, CATV (Cable Television) network, the Internet or other network. The same section 201 supplies the OFDM signal to the transmission line decoding section 202.

When an OFDM signal is broadcast from a broadcasting station, for example, via terrestrial wave, satellite wave or CATV network, the acquisition section 201 includes a tuner or STB as does the acquisition section 12 shown in FIG. 6. On the other hand, when an OFDM signal is multicast as in IPTV (Internet Protocol Television), the acquisition section 201 includes, for example, a network I/F such as NIC (Network Interface Card).

When an OFDM signal is broadcast from a broadcasting station, for example, via terrestrial wave, satellite wave or CATV network, OFDM signals broadcast from a plurality of transmitters via a plurality of transmission lines are received by the single acquisition section 201. As a result, the OFDM signals are received as a single combined OFDM signal.

The transmission line decoding section 202 subjects the OFDM signal, obtained by the acquisition section 201 over a transmission line, to transmission line decoding including at least PLP decoding, supplying the resultant signal to the source decoding section 203.

That is, an OFDM signal compliant with M-PLP is defined by a plurality of data PLPs and a common PLP. Each of the data PLPs includes a packet remaining after a packet common to all TSs has been extracted. The common packet sequence includes a common packet. The transmission line decoding section 202 subjects such an OFDM signal to PLP (packet sequence) decoding.

Further, the OFDM signal obtained by the acquisition section 201 over a transmission line is distorted under the influence of transmission line characteristics. The transmission line decoding section 202 subjects such a signal, for example, to demodulation such as transmission line estimation, channel estimation or phase estimation.

Still further, transmission line decoding includes a process adapted to correct errors that take place in the transmission line. Among error correction coding processes are LDPC coding and Reed Solomon coding.

The source decoding section 203 subjects the signal, which has undergone transmission line decoding, to source decoding including at least a process adapted to decompress the compressed information into the original information.

That is, the OFDM signal obtained by the acquisition section 201 over a transmission line may be compression-coded to compress the information so as to reduce the amount of data such as video and audio data as information. In this case, the source decoding section 203 subjects the signal, which has undergone transmission line decoding, to source decoding such as a process adapted to decompress the compressed information into the original information (decompression).

It should be noted that when the OFDM signal obtained by the acquisition section 201 over a transmission line is not compression-coded, the source decoding section 203 does not perform the process adapted to decompress the compressed information into the original information.

Here, MPEG decoding is an example of decompression. On the other hand, transmission line decoding may include not only decompression but also descrambling and other processes.

In the receiving system configured as described above, the acquisition section 201 subjects video, audio and other data, for example, to compression coding such as MPEG coding. Further, the acquisition section 201 acquires an M-PLP-compliant OFDM signal, which has undergone error correction coding, via a transmission line, supplying the OFDM signal to the transmission line decoding section 202. It should be noted that the OFDM signal is, at this time, distorted under the influence of transmission line characteristics.

The transmission line decoding section 202 subjects the OFDM signal supplied from the acquisition section 201 to the same processes as used by the demodulation process unit 13 shown in FIG. 6 as transmission line coding. The same section 202 supplies the resultant signal to the source decoding section 203.

The source decoding section 203 subjects the signal supplied from the transmission line decoding section 202 to the same processes as used by the decoder 14 shown in FIG. 6 as source decoding. The source decoding section 203 outputs the resultant image or sound.

The receiving system shown in FIG. 12 configured as described above is applicable, for example, to a television tuner adapted to receive digital television broadcasting.

The acquisition section 201, transmission line decoding section 202 and source decoding section 203 can each be configured as a single independent device (hardware (e.g., IC (Integrated Circuit)) or a software module.

Further, the acquisition section 201 and transmission line decoding section 202 may be combined as a single independent device. Alternatively, the transmission line decoding section 202 and source decoding section 203, or the all three sections, may be combined as a single independent device.

FIG. 13 is a diagram illustrating a configuration example of a second embodiment of the receiving system to which the present invention is applied.

It should be noted that like components to those in FIG. 12 are denoted by the same reference numerals, and the description thereof will be omitted below.

The receiving system shown in FIG. 13 is identical to the receiving system shown in FIG. 12 in that it includes the acquisition section 201, transmission line decoding section 202 and source decoding section 203, but differs therefrom in that it additionally includes an output section 211.

The output section 211 is, for example, a display device adapted to display an image or a speaker adapted to produce a sound. The same section 211 outputs, for example, an image or sound that is output in the form of a signal from the source decoding section 203. That is, the output section 211 displays an image or produces a sound.

The receiving system shown in FIG. 13 configured as described above is applicable, for example, to a television receiver adapted to receive digital television broadcasting or radio receiver adapted to receive radio broadcasting.

It should be noted that if the OFDM signal obtained by the acquisition section 201 is not compression-coded, the output signal from the transmission line decoding section 202 is supplied to the output section 211.

FIG. 14 is a diagram illustrating a configuration example of a third embodiment of the receiving system to which the present invention is applied.

It should be noted that like components to those in FIG. 12 are denoted by the same reference numerals, and the description thereof will be omitted below.

The receiving system shown in FIG. 14 is identical to the receiving system shown in FIG. 12 in that it includes the acquisition section 201 and transmission line decoding section 202.

However, the receiving system shown in FIG. 14 differs therefrom in that it does not include the source decoding section 203, but additionally includes a recording section 221.

The recording section 221 records (stores) a signal (e.g., MPEG TS packet) output from the transmission line decoding section 202 on a recording (storage) medium such as optical disk, harddisk (magnetic disk), or flash memory.

The receiving system configured as described above is applicable, for example, to a recorder adapted to record television broadcasting.

It should be noted that the receiving system shown in FIG. 14 may include the source decoding section 203 so that the signal source-decoded by the same section 203, i.e., an image or sound obtained by decoding, can be recorded by the recording section 221.

[Description of the Computer to Which the Present Invention is Applied]

Incidentally, the above series of processes may be performed by hardware or software. If the series of processes are performed by software, the program making up the software is installed to a computer. Here, such a computer may be incorporated in dedicated hardware. Alternatively, such a computer may be able to perform a variety of functions when installed with a variety of programs.

FIG. 15 is a diagram illustrating a configuration example of computer hardware which performs the above series of processes by the program.

In the computer, a CPU (Central Processing Unit) 401, ROM (Read Only Memory) 402 and RAM (Random Access Memory) 403 are connected together via a bus 404.

Further, an I/O interface 405 is connected to the bus 404. An input section 406, output section 407, storage section 408, communication section 409 and drive 410 are connected to the I/O interface 405.

The input section 406 includes, for example, a keyboard, mouse and microphone. The output section 407 includes, for example, a display and speaker. The storage section 408 includes, for example, a hard disk or nonvolatile memory. The communication section 409 includes, for example, a network interface. The drive 410 drives, for example, a removable medium 411 such as magnetic disk, optical disk, magneto-optical disk or semiconductor memory.

In the computer configured as described above, the CPU 401 loads the program from the storage section 408 via the I/O interface 405 and bus 404 into execution, thus allowing for the above series of processes to be performed.

The program executed by the computer (CPU 401) can be supplied, recorded on the removable medium 411 such as a package medium. Alternatively, the program can be supplied via a wired or wireless transmission medium such as local area network, the Internet or digital broadcasting.

In the computer, the program can be installed to the storage section 408 via the I/O interface 405 by inserting the removable medium 411 into the drive 410. Alternatively, the program can be installed to the storage section 408 by receiving the program with the communication section 409 via a wired or wireless transmission medium. Still alternatively, the program may be preinstalled in the ROM 402 or storage section 408.

In the present specification, the steps describing the program stored in the recording medium include not only the processes performed chronologically according to the described sequence but also those that are not performed necessarily chronologically but are performed in parallel or separately.

On the other hand, the term "system" refers in the present specification to an apparatus as a whole that is made up of a plurality of devices.

Further, the embodiments of the present invention are not limited to those described above, but may be modified in various manners without departing from the spirit and scope of the present invention.

The present application contains subject matter related to that disclosed in Japanese Priority Patent Application JP 2009-294545 filed in the Japan Patent Office on Dec. 25, 2009, the entire content of which is hereby incorporated by reference.

What is claimed is:

1. A receiver comprising:
receiving circuitry configured to receive an Orthogonal Frequency Division Multiplexing signal obtained by modulating a common packet sequence and data packet sequence, the common packet sequence being made up of packets common to a plurality of streams, and the data packet sequence being made up of packets specific to one of the plurality of streams;
first sorting circuitry configured to sort the common packet sequence, obtained by demodulating the received Orthogonal Frequency Division Multiplexing signal, in the time domain;
second sorting circuitry configured to sort the data packet sequence, obtained by demodulating the received Orthogonal Frequency Division Multiplexing signal, in the time domain; and
switching circuitry configured to switch an output to error correction circuitry for handling error correction from one sorting circuitry over to other sorting circuitry if, while the one sorting circuitry supplies its output to the error correction circuitry, the other sorting circuitry completes its input of a predetermined unit of information to be processed.

2. The receiver of claim 1, wherein
the switching circuitry switches the output from the one sorting circuitry over to the other sorting circuitry when the input of the first predetermined unit of information to be processed is complete if there are two or more predetermined units of information to be processed of a predetermined frame in the other sorting circuitry.

3. The receiver of claim 2, wherein
the switching circuitry switches the output to the error correction circuitry from the other sorting circuitry over to the one sorting circuitry when the output of the predetermined unit of information processed from the other sorting circuitry is complete.

4. The receiver of claim 3 further comprising:
control circuitry configured to control the output of the one sorting circuitry so that the output from the one sorting circuitry, to which the output has been switched over, resumes from the beginning of the predetermined unit that was terminated incompletely.

5. The receiver of claim 4, wherein
the switching circuitry switches the output from the other sorting circuitry over to the one sorting circuitry when there is one predetermined unit of information to be processed left in the other sorting circuitry if there are two or more predetermined units of information to be processed of a predetermined frame in the other sorting circuitry, and
then, the switching circuitry switches the output again from the one sorting circuitry over to the other sorting circuitry after the resumed output of information by the one sorting circuitry is complete.

6. The receiver of claim 4, wherein
the switching circuitry switches the output from the other sorting circuitry over to the one sorting circuitry when the output of all the units of information processed from the other sorting circuitry is complete if there are two or more predetermined units of information processed of a predetermined frame in the other sorting circuitry.

7. The receiver of claim 1 further comprising:
error correction circuitry configured to perform error correction on the output of either the first or second sorting circuitry.

8. The receiver of claim 1, wherein
the common packet sequence and data packet sequence are respectively a common Physical Layer Pipe and data Physical Layer Pipe generated from a plurality of streams compliant with Multiple Physical Layer Pipes in Digital Video Broadcasting-Terrestrial 2.

9. A receiving method for a receiver, the receiver having receiving circuitry, first and second sorting circuitry and switching circuitry, the receiving method comprising the steps of:
receiving, by the receiving circuitry, an Orthogonal Frequency Division Multiplexing signal obtained by modulating a common packet sequence and data packet sequence, the common packet sequence being made up of packets common to a plurality of streams, and the data packet sequence being made up of packets specific to one of the plurality of streams;
sorting, by the first sorting circuitry, the common packet sequence, obtained by demodulating the received Orthogonal Frequency Division Multiplexing signal, in the time domain;
sorting, by the second sorting circuitry, the data packet sequence, obtained by demodulating the received Orthogonal Frequency Division Multiplexing signal, in the time domain; and
switching, by the switching circuitry, an output to error correction circuitry for handling error correction from one sorting circuitry over to the other sorting circuitry if, while the one sorting circuitry supplies its output to the error correction circuitry, the other sorting circuitry completes its input of a predetermined unit of information to be processed.

10. A non-transitory computer readable medium including a program, which when executed by a computer, causes the computer to:
receive an Orthogonal Frequency Division Multiplexing signal obtained by modulating a common packet sequence and data packet sequence, the common packet sequence being made up of packets common to a plurality of streams, and the data packet sequence being made up of packets specific to one of the plurality of streams;
sort the common packet sequence, obtained by demodulating the received Orthogonal Frequency Division Multiplexing signal, in the time domain;

sort the data packet sequence, obtained by demodulating the received Orthogonal Frequency Division Multiplexing signal, in the time domain; and switch an output to error correction from one sorting over to other sorting if, while the one sorting supplies its output to the error correction, the other sorting completes its input of a predetermined unit of information to be processed.

11. A receiving system comprising:

a communication interface configured to receive Orthogonal Frequency Division Multiplexing signal obtained by modulating a common packet sequence and data packet sequence via a transmission line, the common packet sequence being made up of packets common to a plurality of streams, and the data packet sequence being made up of packets specific to one of the plurality of streams; and transmission line decoding circuitry configured to subject the Orthogonal Frequency Division Multiplexing signal obtained via the transmission line to transmission line decoding including at least packet sequence decoding, wherein the transmission line decoding circuitry includes:
  first sorting circuitry configured to sort the common packet sequence, obtained by demodulating the received Orthogonal Frequency Division Multiplexing signal, in the time domain;
  second sorting circuitry configured to sort the data packet sequence, obtained by demodulating the received Orthogonal Frequency Division Multiplexing signal, in the time domain; and
  switching circuitry configured to switch an output to error correction circuitry for handling error correction from one sorting circuitry over to other sorting circuitry if, while the one sorting circuitry supplies its output to the error correction circuitry, the other sorting circuitry completes its input of a predetermined unit of information to be processed.

12. A receiving system comprising:

transmission line decoding circuitry configured to subject an Orthogonal Frequency Division Multiplexing signal, obtained via a transmission line by modulating a common packet sequence and data packet sequence, to transmission line decoding including at least packet sequence decoding, the common packet sequence being made up of packets common to a plurality of streams, and the data packet sequence being made up of packets specific to one of the plurality of streams; and source decoding circuitry configured to subject the Orthogonal Frequency Division Multiplexing signal that has undergone the transmission line decoding to source decoding including at least decompression of information based on compressed information, wherein the transmission line decoding circuitry includes:
  first sorting circuitry configured to sort the common packet sequence, obtained by demodulating the received Orthogonal Frequency Division Multiplexing signal, in the time domain;
  second sorting circuitry configured to sort the data packet sequence, obtained by demodulating the received Orthogonal Frequency Division Multiplexing signal, in the time domain; and
  switching circuitry configured to switch an output to error correction circuitry for handling error correction from one sorting circuitry over to other sorting circuitry if, while the one sorting circuitry supplies its output to the error correction circuitry, the other sorting circuitry completes its input of a predetermined unit of information to be processed.

13. A receiving system comprising:

transmission line decoding circuitry configured to subject an Orthogonal Frequency Division Multiplexing signal, obtained via a transmission line by modulating a common packet sequence and data packet sequence, to transmission line decoding including at least packet sequence decoding, the common packet sequence being made up of packets common to a plurality of streams, and the data packet sequence being made up of packets specific to one of the plurality of streams; and output circuitry configured to output an image or sound based on the Orthogonal Frequency Division Multiplexing signal that has undergone the transmission line decoding, wherein the transmission line decoding circuitry includes:
  first sorting circuitry configured to sort the common packet sequence, obtained by demodulating the received Orthogonal Frequency Division Multiplexing signal, in the time domain;
  second sorting circuitry configured to sort the data packet sequence, obtained by demodulating the received Orthogonal Frequency Division Multiplexing signal, in the time domain; and
  switching circuitry configured to switch an output to error correction circuitry for handling error correction from one sorting circuitry over to other sorting circuitry if, while the one sorting circuitry supplies its output to the error correction circuitry, the other sorting circuitry completes its input of a predetermined unit of information to be processed.

14. A receiving system comprising:

transmission line decoding circuitry configured to subject an Orthogonal Frequency Division Multiplexing signal, obtained via a transmission line by modulating a common packet sequence and data packet sequence, to transmission line decoding including at least packet sequence decoding, the common packet sequence being made up of packets common to a plurality of streams, and the data packet sequence being made up of packets specific to one of the plurality of streams; and recording circuitry configured to record the Orthogonal Frequency Division Multiplexing signal that has undergone the transmission line decoding, wherein the transmission line decoding circuitry includes:
  first sorting circuitry configured to sort the common packet sequence, obtained by demodulating the received Orthogonal Frequency Division Multiplexing signal, in the time domain;
  second sorting circuitry configured to sort the data packet sequence, obtained by demodulating the received Orthogonal Frequency Division Multiplexing signal, in the time domain; and
  switching circuitry configured to switch an output to error correction circuitry for handling error correction from one sorting circuitry over to other sorting circuitry if, while the one sorting circuitry supplies its output to the error correction circuitry, the other sorting circuitry completes its input of a predetermined unit of information to be processed.

15. A receiver comprising:

means for receiving an Orthogonal Frequency Division Multiplexing signal obtained by modulating a common packet sequence and data packet sequence, the common packet sequence being made up of packets common to a plurality of streams, and the data packet sequence being made up of packets specific to one of the plurality of streams;

first means for sorting the common packet sequence, obtained by demodulating the received Orthogonal Frequency Division Multiplexing signal, in the time domain;

second means for sorting the data packet sequence, obtained by demodulating the received Orthogonal Frequency Division Multiplexing signal, in the time domain; and means for switching an output to an error correction means for handling error correction from one sorting means over to other sorting means if, while the one sorting means supplies its output to the error correction means, the other sorting means completes its input of a predetermined unit of information to be processed.

* * * * *